Jan. 12, 1960 J. J. HAGOPIAN 2,920,379

METHOD OF MAKING PERPENDICULAR MAGNETIC RECORDING HEAD

Filed Nov. 6, 1956

2 Sheets-Sheet 1

INVENTOR.
JACOB J. HAGOPIAN

BY

ATTORNEY

United States Patent Office 2,920,379

Patented Jan. 12, 1960

2,920,379

METHOD OF MAKING PERPENDICULAR MAGNETIC RECORDING HEAD

Jacob J. Hagopian, Santa Clara County, Calif., assignor to International Business Machines Corporation, New York, N.Y., a corporation of New York Application November 6, 1956, Serial No. 620,758

4 Claims. (Cl. 29—155.58)

This invention relates in general to magnetic recording heads and in particular to an improved perpendicular magnetic recording head and the method of making it. The invention has particular application to recording heads which are supported in recording relationship with the recording medium by a thin film of air.

Two general types of magnetic recording heads have been suggested in the prior art. One of these, referred to as a longitudinal magnetic recording head, employs a pole piece which produces a magnetic field whose direction is substantially the same as the movement of the recording medium. The second general type is the perpendicular magnetic recording head which produces a magnetic recording field having a direction normal to the surface of the recording medium.

Longitudinal type recording heads usually employ ring-shaped or delta-shaped cores which, because of their inherent shapes, have relatively poor space factors. Perpendicular type heads, on the other hand, employ probe type cores which are simpler and more economical in construction, especially where the space factor of the head is an important consideration. However, with perpendicular probe type cores the magnetic field has a tendency to spread out in the vicinity of the recording medium, and hence the resolution or signal density per unit area is relatively poor compared with that of the longitudinal type recording head. To improve the resolution, the prior art has suggested various types of shielding arrangements which function to narrow or focus the recording field, thereby allowing more information to be stored on the recording medium. Such suggested shielding arrangements, while improving the resolution to some extent, complicate the manufacture of the head and are not readily adaptable to very small recording heads.

The present invention is directed to a magnetic recording head embodying a perpendicular recording probe and a shield arranged for relatively simple and economical assembly and resulting in improved resolution.

It is, therefore, an object of the present invention to provide a simple and economical perpendicular magnetic recording head having high resolution.

Another object of the present invention is to provide a simple and inexpensive method of making a perpendicular magnetic pole piece.

A still further object of the present invention is to provide an improved method of making a shielded perpendicular magnetic recording head.

Other objects of the invention will be pointed out in the following description and claims and illustrated in the accompanying drawings, which disclose, by way of example, the principle of the invention and the best mode which has been contemplated of applying that principle.

Figure 4:
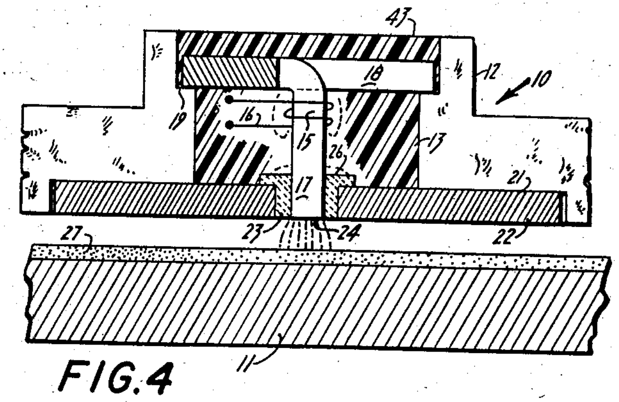
Fig. 4 is a view in section taken along the line 4—4 of Fig. 3.

Referring to the drawings and particularly to Fig. 4, the recording head 10, illustrated in recording engagement with a recording medium 11, comprises a casing 12 of non-magnetic material, such as aluminum. Casing 12 has a cylindrical opening 13 for receiving a coil assembly 15 comprising a coil 16 surrounding a single pole piece type recording probe 17 integrally united with a cap member 18 of high permeability material. The cylindrical opening 13 may be provided at one end with a shoulder 19 which functions as a seat for positioning cap member 18 and probe 17 in the casing 12. The other end of the opening 13 is likewise provided with a shoulder 21 which forms a seat for accurately positioning a shield 22 of high permeability material. Shield 22 is provided with an opening 23 into which the distal end 24 of probe 17 is inserted. Spacers 26 of non-magnetic material are disposed between the sides of the probe 17 and the edge portions of the shield defining opening 23. The recording head may, if desired, be encapsulated or potted in plastic to maintain the parts in the position shown in Fig. 4.

Figure 5:
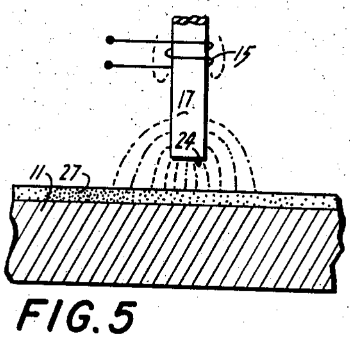
Fig. 5 is a view illustrating how the magnetic field spreads out from an unshielded perpendicular type pole piece.

Fig. 5 illustrates the shape of the magnetic field for a perpendicular type probe when no shield is employed. It will be noted that the field has a decided tendency to fan out from the sides of the probe, causing relatively poor resolution. By employing the shield 22 of high permeability material adjacent the recording surface 27 and a cap portion 18 above the probe 17, resolution of signal density along a track is greatly improved over unshielded perpendicular type recording probes. This is because the stray flux, which leaves the side surfaces of the recording probe, is shunted through the shield 22 and cap 18 to the probe 17 rather than to the portion of the recording medium not directly underneath the probe 17. Similarly, when the recording head 10 is employed to "read," the probe 17 is subjected to substantially only the magnetized portion of the recording medium 11 which is directly beneath the probe.

Figures 6, 7:
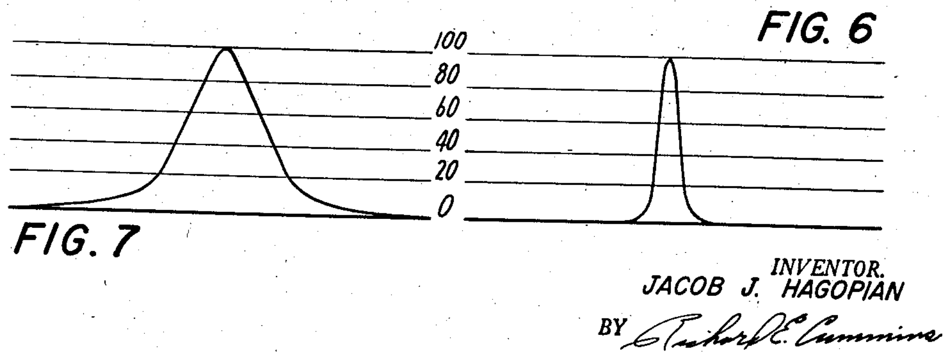
Figs. 6 and 7 are graphs illustrating how the resolution of the shielded type pole piece is improved over the unshielded pole piece.

Figs. 6 and 7, which are graphs derived from actual observation of the time variational read signal and knowledge of the surface velocity of the recording medium, illustrate how the resolution is improved by shield 22.

Figure 8:
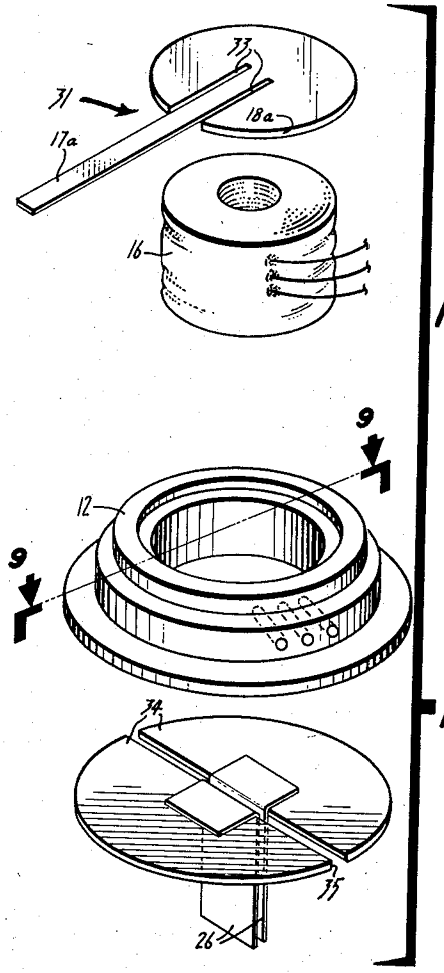
Fig. 8 is an exploded view of the recording head shown in Fig. 1, illustrating the various component parts.
Figure 9:
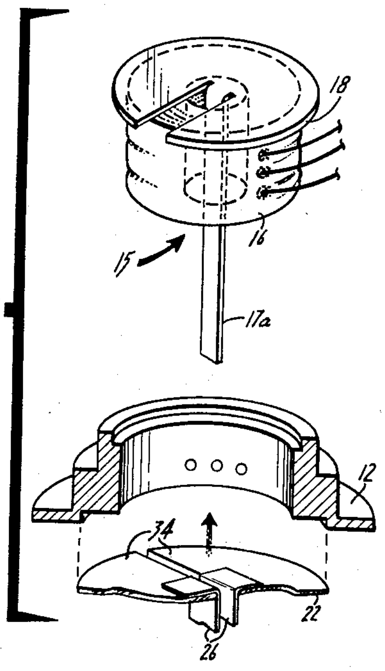
Fig. 9 is also an exploded view, partly in section, illustrating how the parts shown in Fig. 8 are assembled.
Figure 10:
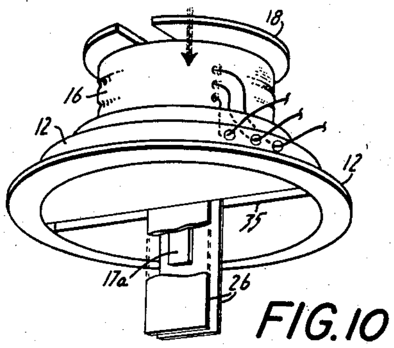
Fig. 10 is a perspective view of the recording head just prior to completion.
Figure 2:
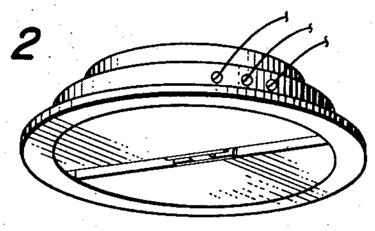
Fig. 2 is an enlarged perspective view of the recording head shown in Fig. 1.
Figure 1:
Fig. 1 is a view in elevation, approximately twice actual size, illustrating a magnetic recording head embodying the present invention.
Figure 3:
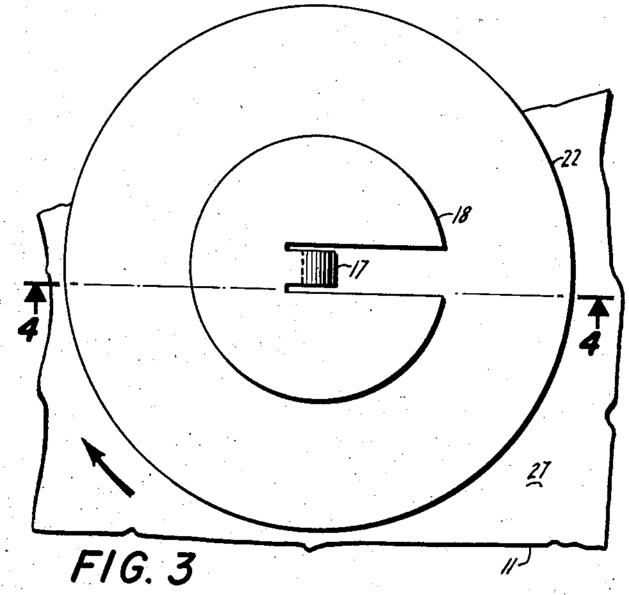
Fig. 3 is a plan view of the recording head shown in Fig. 2.

The method of making the magnetic recording head shown in Fig. 1 is illustrated in Figs. 8 through 10. Referring to Fig. 8 which is an exploded view showing the various components of the recording head 10 prior to being assembled, one of the first steps in the assembly process is the forming of the cap and probe blank 31. The pole piece 17 and cap shield 18 are formed from blank 31 which has a first portion 18*a* corresponding in shape to the cap 18 and a second portion 17*a*, integral with the first portion and corresponding in shape to the pole piece 17. Blank 31 is approximately 2 mils "thick" and is preferably obtained by etching a piece of magnetically "soft" or high permeability material to the desired shape which, as shown in the preferred embodiment, is generally circular except for the radially extending probe portion 17*a* defined partly by the slots 33. However, blank 31 may be obtained by any suitable means known in the art.

The coil 16 may be any suitable coil which is capable of translating electrical variations into magnetic variations. Coil 16 is preferably pre-formed with an inside diameter sufficient to allow the insertion of the probe 17 and of the type which may be employed either to record or to sense changes in magnetic intensity.

The shield 22 is made of high permeability material and is provided with a centrally disposed opening 23. The shield 22, as shown, comprises a pair of semi-circular members 34 whose diametrical edges 35 define the opening 23 through which the probe portion 17*a* may pass. Non-magnetic means are provided for accurately spacing the sides of the probe portion 17*a* from the diametrical edges 35 of the shield 22. This means, as shown, comprises plastic spacers 26 which are suitably fixed to the shield 22 and extend downward through the opening 23 past the edges 35.

The following steps may be employed in the assembly of the magnetic head. Initially, the cap and probe blank 31 is obtained as previously described and the probe portion 17*a* of the blank bent normal to the plane of the cap portion 18*a*. The coil 16 may then be inserted over the probe portion 17*a* to form a coil assembly 15, shown in Fig. 9. The coil assembly 15 may then be positioned in the casing 12 with cap 18 disposed on shoulder 19 and the two semi-circular portions 34 of the shield 22 placed in position on shoulder 21.

Alternatively, shield 22 may be formed in one piece and an opening provided for receiving the probe 17. With such an arrangement the non-magnetic spacing means may be provided either by coating the probe with the non-magnetic material or by coating the shield with the non-magnetic material and punching the opening so as to draw a layer of the non-magnetic material to the inside of the opening.

The assembly is preferably encapsulated in a suitable material 43, such as plastic, and the surface of the recording head adjacent the recording medium finished off smoothly so that the end of the probe 17, the spacers 26 and the shield 22 are flush with the undersurface of the casing 12. An advantage of such an arrangement is that the surface finishing of the head for gliding use does not change the geometry of the recording probe 17 with respect to the shield 22. A further advantage is that the recording head may be made quite thin, approximately 0.1 inch, so that if a number of recording discs are employed for information storage, such as in electronic computers or accounting machines, the space occupied by the storage section is considerably reduced.

While there have been shown and described and pointed out the fundamental novel features of the invention as applied to the preferred embodiment, it will be understood that various omissions and substitutions and changes in the form and details of the device illustrated and in its operation may be made by those skilled in the art without departing from the spirit of the invention. It is the intention, therefore to be limited only as indicated by the scope of the following claims.

What is claimed is:

1. The method of making a perpendicular magnetic recording head comprising the steps of forming a flat, thin blank from high permeability material to define a generally circular first portion and a second portion integral with said first portion and extending generally radially from the central area thereof; bending said second portion normal to said first portion to define a coil-receiving pole piece and integral cap shield; positioning a coil on said pole piece to form a coil assembly; forming a disc-like shield member of high permeability material having an opening for receiving the distal end of said pole piece; lining diametrically opposite sides of said opening with non-magnetic material; positioning said coil assembly and said disc-like shield in a non-magnetic holder with said shields spaced on opposite sides of said coil and with the distal end of said pole piece between said lined diametrical edges; encapsulating said head to fix said positioned coil assembly and shield in said holder; and working the portion of said encapsulated head positionable adjacent the recording medium to a smooth surface.

2. The invention set forth in claim 1 wherein the disc-like shield member is formed in two semi-circular sections and subsequently positioned in said holder so that the diametrical edges of said sections define said pole piece receiving opening.

3. The invention set forth in claim 1 wherein said opposite edges are lined with non-magnetic material by first coating the disc-like shield with said non-magnetic material and then punching said opening in said shield to cause the non-magnetic material to be displaced to said edges.

4. The invention set forth in claim 2 wherein plastic tabs are attached to the top surface of said sections and extend downward over said edges through said opening.

References Cited in the file of this patent

UNITED STATES PATENTS

| | | |
|---|---|---|
| 2,089,287 | Molloy | Aug. 10, 1937 |
| 2,205,669 | Pye | June 25, 1940 |
| 2,523,515 | Porter | Sept. 26, 1950 |
| 2,560,926 | Brownell | July 17, 1951 |
| 2,754,569 | Kornei | July 17, 1956 |
| 2,801,293 | Howell et al. | July 30, 1957 |

FOREIGN PATENTS

| | | |
|---|---|---|
| 617,796 | Germany | Aug. 28, 1935 |
| 836,112 | Germany | Apr. 7, 1952 |